US012778845B2

(12) United States Patent
Levy et al.

(10) Patent No.: US 12,778,845 B2
(45) Date of Patent: Nov. 3, 2026

(54) CRYO-DURABLE FLUOROPOLYMER SPIKE PORT

(71) Applicant: W. L. Gore & Associates, Inc., Newark, DE (US)

(72) Inventors: Shannon L. Levy, Newark, DE (US); Shawn C. O'Donnell, Newark, DE (US); Alan Henderson, Newark, DE (US); Matthew A. Johnson, Bear, DE (US)

(73) Assignee: W. L. Gore & Associates, Inc., Newark, DE (US)

(*) Notice: Subject to any disclaimer, the term of this patent is extended or adjusted under 35 U.S.C. 154(b) by 1074 days.

(21) Appl. No.: 17/953,044

(22) Filed: Sep. 26, 2022

(65) Prior Publication Data

US 2023/0096642 A1 Mar. 30, 2023

Related U.S. Application Data

(60) Provisional application No. 63/248,080, filed on Sep. 24, 2021.

(51) Int. Cl.

| | |
|---|---|
| ***A01N 1/147*** | (2025.01) |
| ***A61J 1/14*** | (2023.01) |
| *A61J 1/10* | (2006.01) |

(52) U.S. Cl.

CPC ............ *A61J 1/1468* (2015.05); *A01N 1/147* (2025.01); *A61J 1/1406* (2013.01); *A61J 1/1425* (2015.05); *A61J 1/1487* (2015.05); *A61J 1/10* (2013.01)

(58) Field of Classification Search

CPC ......... A61J 1/1475–1487; A61J 1/1412–1431; A61J 1/1406; A61J 1/10

See application file for complete search history.

(56) References Cited

U.S. PATENT DOCUMENTS 3,368,560 A * 2/1968 Gewecke .................. A61J 1/10 604/408
3,470,893 A * 10/1969 Nelson .................... F16L 57/00 285/125.1

(Continued)

FOREIGN PATENT DOCUMENTS

CA 3070459 A1 * 2/2019 ........ A61M 5/16831
DE 202017006883 U1 * 9/2018 ............. B32B 37/06

(Continued)

OTHER PUBLICATIONS

DE-202017006883-U1 English translation (Year: 2018).*
KR-20110062812-A English translation (Year: 2011).*

*Primary Examiner* — Nathan R Price

(57) ABSTRACT

A port includes a conduit configured to receive a spike therein. The conduit includes a first portion, a second portion, and a septum fluidly separates the first portion and the second portion of the conduit. The septum is puncturable by the spike so as to allow the spike to be inserted into the second portion of the conduit. A removable snap portion extends from a break point to the tip of the port. The thickness of the break point is less than the thickness of the remainder of the conduit wall. The removable snap portion is configured to break away from the port at the break point such that the septum is accessible by the spike via the first portion of the conduit when the removable snap portion is broken away from the port. The port may include fluorinated ethylene propylene, ethylene tetrafluoroethylene, perfluoroalkoxy alkane, and combinations thereof.

22 Claims, 11 Drawing Sheets

(56) References Cited

U.S. PATENT DOCUMENTS

| | | | | | |
|---|---|---|---|---|---|
| 3,509,879 | A * | 5/1970 | Bathish | A61J 1/10 604/408 |
| 3,994,412 | A * | 11/1976 | Difiglio | A61J 1/10 222/541.9 |
| 4,295,495 | A | 10/1981 | Rosemeier et al. | |
| 4,550,842 | A | 11/1985 | Cummings | |
| 5,209,745 | A | 5/1993 | Irr et al. | |
| 5,708,044 | A | 1/1998 | Branca | |
| 5,728,086 | A * | 3/1998 | Niedospial, Jr. | A61J 1/1487 604/408 |
| 6,541,589 | B1 | 4/2003 | Baillie | |
| 7,083,225 | B2 | 8/2006 | Yakata et al. | |
| 7,531,611 | B2 | 5/2009 | Sabol et al. | |
| 8,162,915 | B2 * | 4/2012 | Brandenburger | A61M 39/20 604/403 |
| 8,637,144 | B2 | 1/2014 | Ford | |
| 9,139,669 | B2 | 9/2015 | Xu et al. | |
| 9,357,763 | B2 | 6/2016 | Cullis et al. | |
| 9,468,585 | B2 | 10/2016 | Paruit et al. | |
| 2016/0030283 | A1 * | 2/2016 | Snyder | B31B 70/864 383/7 |
| 2016/0369225 | A1 * | 12/2016 | Coupier | A01N 1/147 |
| 2018/0100135 | A1 | 4/2018 | Coupier | |

FOREIGN PATENT DOCUMENTS

| | | | | |
|---|---|---|---|---|
| KR | 20110062812 | A * | 6/2011 | C12N 5/00 |
| WO | WO-2020222220 | A1 * | 11/2020 | A61J 1/10 |

* cited by examiner

CRYO-DURABLE FLUOROPOLYMER SPIKE PORT

CROSS-REFERENCE TO RELATED APPLICATION

This application claims the benefit of U.S. Provisional Patent Application No. 63/248,080 filed Sep. 24, 2021, titled "CRYO-DURABLE FLUOROPOLYMER SPIKE PORT," the entire disclosure of which is expressly incorporated by reference herein.

FIELD

The present disclosure relates to ports for bags for storing and administering therapeutic solutions, and more particularly, to spike ports for cryopreservation bags and a method for manufacturing such a spike port.

BACKGROUND

In cryopreservation applications, cell and gene therapies are stored and transported frozen in storage bags. Frozen storage maintains protein and/or cell stability over the storage time. For instance, modified cell therapies often must be stored and transported at very low temperatures (e.g., −150° C.) to stabilize the cells. At these temperatures, many materials become brittle and cannot properly protect the cell therapy.

Additionally, cell therapies housed in storage bags need to be accessed by a user for therapy delivery, which is often accomplished with a spike port. Therefore, in addition to being durable through cryopreservation (cryo-durable), spike ports need to provide an accessible, sealed, sterile chamber that is easy to use, compatible with current processes, and does not particulate or contaminate the cell therapy.

SUMMARY

The summary is a high-level overview of various aspects of the invention and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim.

Embodiments of the present disclosure relate to a port including a conduit extending along a longitudinal axis and configured to receive a spike therein. The conduit is configured to be fluidly connected to an inner compartment of a cryo-durable bag. The conduit is enclosed by a conduit wall, where the conduit includes: i) a first portion defining an inner surface; and ii) a second portion. The port also includes a septum fluidly separating the first portion and the second portion of the conduit. The septum has a thickness from 0.25 mm to 0.64 mm. An inner diameter of the first portion at the septum curve transition is from 3.9 mm to 5.7 mm. The septum is configured to be punctured by the spike that is inserted into the first portion of the conduit so as to allow the spike to be inserted into the second portion of the conduit. The port also includes a removable snap portion extending from a break point in the conduit wall to a tip of the port. The conduit wall has a thickness from 0.06 mm to 0.76 mm at the break point. The removable snap portion is configured to break away from the port at the break point such that the septum is accessible by the spike via the first portion of the conduit when the removable snap portion is broken away from the port. The port comprises fluorinated ethylene propylene, ethylene tetrafluoroethylene, or perfluoroalkoxy alkane, where the fluorinated ethylene propylene, ethylene tetrafluoroethylene, or perfluoroalkoxy alkane has a critical shear rate of greater than 10 $sec^{-1}$. The port is configured to be bonded to the cryo-durable bag.

In some embodiments, the port further includes an inlet configured to be fluidly connected to the inner compartment of the cryo-durable bag.

In some embodiments, the port further includes a port cavity configured to fluidly connect the second portion of the conduit to the inner compartment of the cryo-durable bag when the port is bonded to the cryo-durable bag.

In some embodiments, the septum is from 4 mm to 20 mm away from the break point.

In some embodiments, a curve transition from the inner surface of the first portion to the septum has a radius of curvature from 0 mm to 1.02 mm.

In some embodiments, the inner surface of the first portion is angled by 0° to 6° with respect to the longitudinal axis such that the inner diameter is smaller at the septum than at the break point such that the inner surface of the first portion is configured to create a fluid and sterile seal with the spike when the spike is inserted into the second portion via the first portion.

In some embodiments, the port is cryo-durable.

In some embodiments, the thickness of the break point is less than a thickness of a remainder of the conduit wall.

In some embodiments, the break point is positioned adjacent to the first portion of the conduit.

Embodiments of the present disclosure relate to a port including a conduit extending along a longitudinal axis and configured to receive a spike therein. The conduit is configured to be fluidly connected to an inner compartment of a cryo-durable bag. The conduit is enclosed by a conduit wall, where the conduit includes: i) a first portion defining an inner surface; and ii) a second portion. The port also includes a septum fluidly separating the first portion and the second portion of the conduit. The septum has a thickness from 0.25 mm to 0.64 mm. A curve transition from the inner surface of the first portion to the septum has a radius of curvature from 0 mm to 1.02 mm. An inner diameter of the first portion at the septum curve transition is from 3.9 mm to 5.7 mm. The septum is configured to be punctured by the spike that is inserted into the first portion of the conduit so as to allow the spike to be inserted into the second portion of the conduit. The port also includes a removable snap portion extending from a break point in the conduit wall to a tip of the port. The conduit wall has a thickness from 0.06 mm to 0.76 mm at the break point and the thickness of the break point is less than a thickness of the remainder of the conduit wall. The break point is positioned adjacent to the first portion of the conduit. The removable snap portion is configured to break away from the port at the break point such that the septum is accessible by the spike via the first portion of the conduit when the removable snap portion is broken away from the port. The port comprises fluorinated ethylene propylene, ethylene tetrafluoroethylene, or perfluoroalkoxy alkane, where the fluorinated ethylene propylene, ethylene tetrafluoroethylene, or perfluoroalkoxy alkane has a critical shear rate of greater than 10 $sec^{-1}$. The port is configured to be integrated with the cryo-durable bag.

In some embodiments, the port further includes an inlet configured to be fluidly connected to the inner compartment of the cryo-durable bag.

In some embodiments, the port further includes a port cavity configured to fluidly connect with the inlet.

In some embodiments, the port further includes a port cavity configured to fluidly connect the second portion of the conduit to the inner compartment of the cryo-durable bag when the port is bonded to the cryo-durable bag.

In some embodiments, the inner surface of the first portion is angled by 0° to 6° with respect to the longitudinal axis such that the inner diameter is smaller at the septum than at the break point such that the inner surface of the first portion is configured to create a sterile seal with the spike when the spike is inserted into the second portion via the first portion.

In some embodiments, the port is cryo-durable.

Embodiments of the present disclosure relate to a port including at least one conduit extending along a longitudinal axis and configured to receive a spike therein. The at least one conduit is configured to be fluidly connected to an inner compartment of a cryo-durable bag. The at least one conduit is enclosed by a conduit wall and comprises a first portion defining an inner surface and a second portion. The port includes a septum fluidly separating the first portion and the second portion of the at least one conduit. The septum is configured to be punctured by the spike that is inserted into the first portion of the at least one conduit so as to allow the spike to be inserted into the second portion of the at least one conduit. The port includes a removable snap portion extending from a break point in the conduit wall to a tip of the port, the removable snap portion configured to break away from the port at the break point. The port includes fluorinated ethylene propylene, ethylene tetrafluoroethylene, or perfluoroalkoxy alkane, wherein the fluorinated ethylene propylene, ethylene tetrafluoroethylene, or perfluoroalkoxy alkane has a critical shear rate of greater than 10 $sec^{-1}$. The port is configured to be integrated to the cryo-durable bag. The inner surface of the first portion is angled by between approximately 0° and 6.0° with respect to the longitudinal axis and a curve transition from the inner surface of the first portion to the septum has a radius of curvature of between approximately 0 mm and 1.02 mm.

In some embodiments, the port includes an inlet configured to be fluidly connected to the inner compartment of the cryo-durable bag.

In some embodiments, the at least one conduit includes a first conduit and a second conduit, and the inlet is arranged between the first conduit and the second conduit.

In some embodiments, the port further includes a port cavity configured to fluidly connect the second portion of the conduit to the inner compartment of the cryo-durable bag when the port is bonded to the cryo-durable bag.

In some embodiments, the port is cryo-durable.

In some embodiments, the septum has a thickness from 0.25 mm to 0.64 mm and wherein an inner diameter of the first portion at the septum curve transition is from 3.9 mm to 5.7 mm.

Embodiments of the present disclosure relate to a port including a conduit extending along a longitudinal axis and configured to receive a spike therein, the conduit configured to be fluidly connected to an inner compartment of a cryo-durable bag, wherein the conduit comprises a first portion and a second portion and is enclosed by a conduit wall. The port includes a septum fluidly separating the first portion and the second portion of the conduit. The septum is configured to be punctured by the spike that is inserted into the first portion of the conduit so as to allow the spike to be inserted into the second portion of the conduit. Optionally, the septum has a thickness from 0.25 mm and 0.64 mm. Optionally, an inner diameter of the first portion at the septum curve transition is from 3.9 mm to 5.7 mm. The port includes a removable snap portion extending from a break point in the conduit wall to a tip of the port. The removable snap portion is configured to break away from the port at the break point. Optionally, the port is formed of a material having a critical shear rate of greater than 10 $sec^{-1}$.

BRIEF DESCRIPTION OF THE FIGURES

The accompanying drawings are included to provide a further understanding of the disclosure and are incorporated in and constitute a part of this specification, illustrate embodiments, and together with the description serve to explain the principles of the present disclosure.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale but may be exaggerated to illustrate various aspects of the present disclosure, and in that regard, the figures should not be construed as limiting.

Described herein are cryopreservation-durable (cryo-durable) ports for accessing cell therapies held in cryopreservation storage bags for bulk storage, cell and gene therapies, apheresis products, intermediate processing, and primary packaging. Also described herein are methods for forming the cryo-durable ports and methods for forming a cryo-durable bag with the cryo-durable port. In some embodiments, the cryo-durable ports include fluorinated ethylene propylene (FEP). In some embodiments, the cryo-durable ports include ethylene tetrafluoroethylene (ETFE). In some embodiments, the cryo-durable ports include perfluoroalkoxy alkane (PFA). In some embodiments, the cryo-durable ports allow a user to easily access the cell therapies through a sterile conduit. In some embodiments, the cryo-durable port is a spike port that enables spike penetration while simultaneously forming a fluid and sterile seal between the port and the spike, and without creating particulates that may contaminate the cell therapy. In some embodiments, methods for forming the port so as to improve durability at freezing temperatures while maintaining a sterile environment and the ability of the port to bond to the film of a cryopreservation storage bag are described herein. In some embodiments, the cryo-durable ports are both crack and impact resistant at freezing temperatures.

Figure 1:
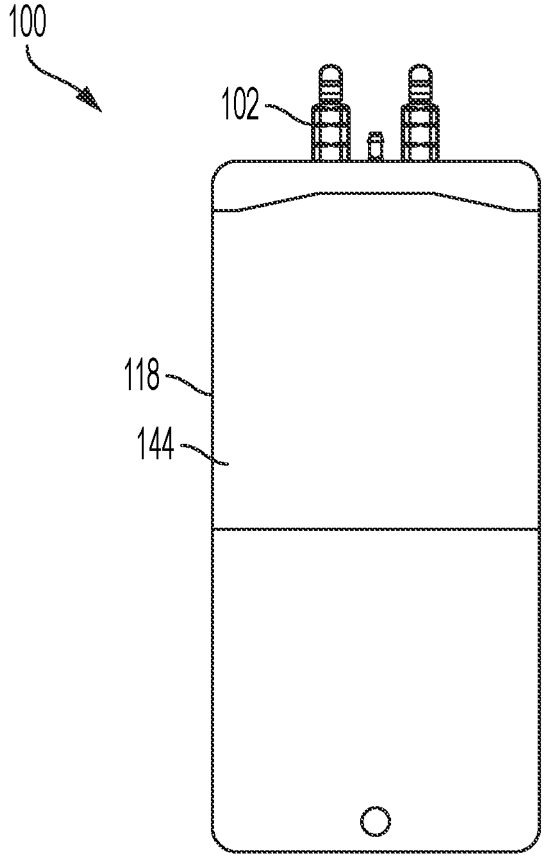
FIG. 1 is a front view of a storage bag including a port according to embodiments of the present disclosure.

FIG. 1 depicts a storage bag 100 including a spike port 102. The spike port 102 is configured to provide fluid access to the interior of the storage bag 100 in a sterile manner. In some embodiments, the storage bag 100 is a cryopreservation bag and the spike port 102 is a cryo-durable port. As defined herein, a "cryopreservation bag" is a storage bag that protects biologic solutions at cryogenic temperatures during freeze, storage, transport, and thaw. "Cryo-durable", as defined herein, is the ability to resist cracking and/or breaking on impact or from vibrations at cryogenic temperatures. "Cryogenic temperatures", as defined herein, are temperatures less than −80° C.

Figure 2:
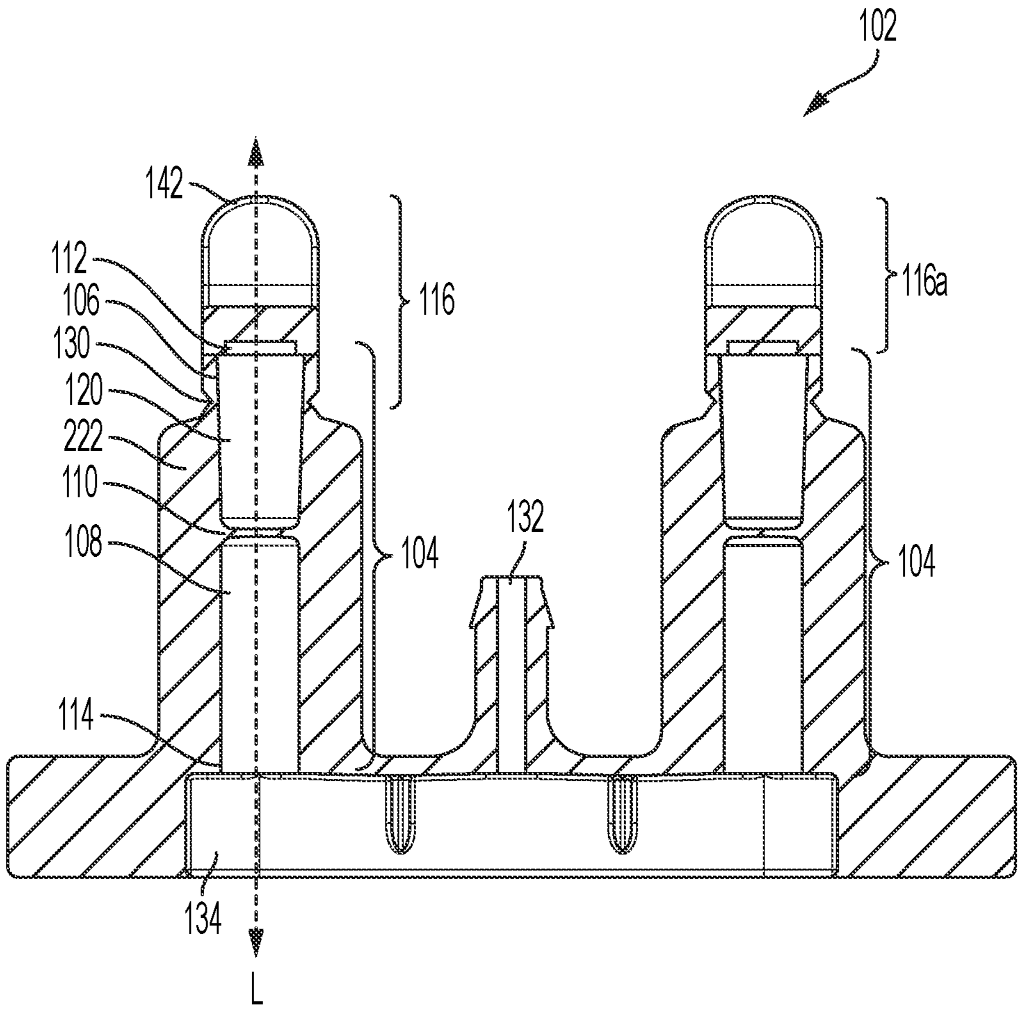
FIG. 2 is a cross-sectional view of the port of the storage bag according to embodiments of the present disclosure.

In some embodiments, the spike port 102 is configured to receive a spike therein. As depicted in FIG. 2, in some embodiments, to facilitate the insertion of a spike therein, the spike port 102 includes at least one hollow conduit 104, illustratively two hollow conduits 104, extending along a central longitudinal axis L. However, as will be described further herein, the spike port 102 may include any number of hollow conduits 104. The conduit 104 is enclosed by a conduit wall 122 and, in some embodiments, includes a first portion 106 and a second portion 108. In some embodiments, the first portion 106 and the second portion 108 are fluidly separated by a septum 110, as will be described in further detail below. In some embodiments, the conduit 104 extends from a first end 112 to a second end 114. In some embodiments, the conduit 104 is in fluid communication with the storage bag 100 via the second end 114, which is fluidly connected to an interior compartment 118 of the storage bag 100. Prior to use of the spike port 102, the first end 112 of the conduit 104 is sealed by at least a portion of the removable snap portion 116, and more particularly a first portion **116*a* of the removable snap portion 116**, as will be described in further detail below.

In some embodiments, the conduit 104 is tubular in shape. However, in other embodiments, the conduit 104 may have any shape so long as a sterile environment is maintained when the spike is inserted therein. In some embodiments, the conduit 104 has a length from 5.8 mm to 40.2 mm. In some embodiments, the conduit 104 has a length of 5.8 mm to 35 mm. In some embodiments, the conduit 104 has a length from 5.8 mm to 30 mm. In some embodiments, the conduit 104 has a length from 5.8 mm to 25 mm. In some embodiments, the conduit 104 has a length from 5.8 mm to 20 mm. In some embodiments, the conduit 104 has a length from 5.8 mm to 15 mm. In some embodiments, the conduit 104 has a length from 5.8 mm to 10 mm.

In some embodiments, the conduit 104 has a length of 10 mm to 40.2 mm. In some embodiments, the conduit 104 has a length from 15 mm to 40.2 mm. In some embodiments, the conduit 104 has a length from 20 mm to 40.2 mm. In some embodiments, the conduit 104 has a length from 25 mm to 40.2 mm. In some embodiments, the conduit 104 has a length from 30 mm to 40.2 mm. In some embodiments, the conduit 104 has a length from 35 mm to 40.2 mm.

In some embodiments, the conduit 104 has a length of 10 mm to 35 mm. In some embodiments, the conduit 104 has a length from 15 mm to 20 mm. In some embodiments, the conduit 104 has a length from 20 mm to 35 mm. In some embodiments, the conduit 104 has a length from 25 mm to 35 mm. In some embodiments, the conduit 104 has a length from 15 mm to 25 mm. In some embodiments, the conduit 104 has a length from 10 mm to 20 mm.

In some embodiments, the first portion 106 of the conduit 104 extends from the first end 112 of the conduit 104 to the septum 110. The first portion 106 defines an inner surface 120, which surrounds the hollow interior of the first portion 106. In some embodiments, the first portion 106 has an inner diameter that is uniform along the length of the first portion 106. In some embodiments, the first portion 106 has an inner diameter that decreases from the first end 112 to the septum 110. For example, in some embodiments, the inner surface 120 of the first portion 106 is angled by 0° to 6° with respect to the longitudinal axis L. In some embodiments, the inner surface 120 is angled by 0° to 5° with respect to the longitudinal axis L. In some embodiments, the inner surface 120 is angled by 0° to 4° with respect to the longitudinal axis L. In some embodiments, the inner surface 120 is angled by 0° to 3° with respect to the longitudinal axis L. In some embodiments, the inner surface 120 is angled by 0° to 2° with respect to the longitudinal axis L. In some embodiments, the inner surface 120 is angled by 0° to 1° with respect to the longitudinal axis L.

In some embodiments, the inner surface 120 is angled by 2° to 6° with respect to the longitudinal axis L. In some embodiments, the inner surface 120 is angled by 3° to 6° with respect to the longitudinal axis L. In some embodiments, the inner surface 120 is angled by 4° to 6° with respect to the longitudinal axis L. In some embodiments, the inner surface 120 is angled by 5° to 6° with respect to the longitudinal axis L.

In some embodiments, the inner surface 120 is angled by 2° to 5° with respect to the longitudinal axis L. In some embodiments, the inner surface 120 is angled by 2° to 4° with respect to the longitudinal axis L. In some embodiments, the inner surface 120 is angled by 2° to 3° with respect to the longitudinal axis L. In some embodiments, the inner surface 120 is angled by 3° to 5° with respect to the longitudinal axis L. In some embodiments, the inner surface 120 is angled by 3° to 4° with respect to the longitudinal axis L. In some embodiments, the inner surface 120 is angled by 4° to 5° with respect to the longitudinal axis L.

In some embodiments, the spike port 102 can include a septum (e.g., a membrane, a thin walled extrusion or molded part, or other separating feature) which is configured to prevent leakage of a cell therapy fluid from the interior compartment of the storage bag 100 as part of a sterile environment and a closed environment. As defined herein, a "sterile environment" is an environment in which a material, such as a biomaterial (e.g., cell therapy), is preserved and/or stored without contamination, loss or leakage of the material. As used herein, a "closed environment" includes an environment that is walled in or contained. A closed environment also describes an environment that can communicate with or provide access to/from an outside environment, including another closed environment, but also may be configured to prevent communication with the outside environment and the closed environment.

Biological moieties and cell therapies suitable for storage using the devices described herein include cells, viruses, viral vectors, bacteria, proteins, antibodies, genetic material and other bioactive moieties. Various types of prokaryotic cells, eukaryotic cells, mammalian cells, non-mammalian cells, and/or stem cells may be used with storage bags of the present disclosure. In some embodiments, the cells secrete a therapeutically useful substance. Such substances include hormones, growth factors, trophic factors, neurotransmitters, lymphokines, antibodies, or other cell products which provide a therapeutic benefit. These substances are also suitable for storage in these devices described herein.

In the embodiment of FIGS. 1-5, as described above, the spike port 102 is a spike port including a septum 110 fluidly separating the first portion 106 and the second portion 108. The septum 110 is configured to be pierced by a spike such that the septum 110 remains attached to the conduit wall 122, while also not creating particles that would contaminate the cell therapy material within the interior compartment 118 of the storage bag 100.

Figure 3:
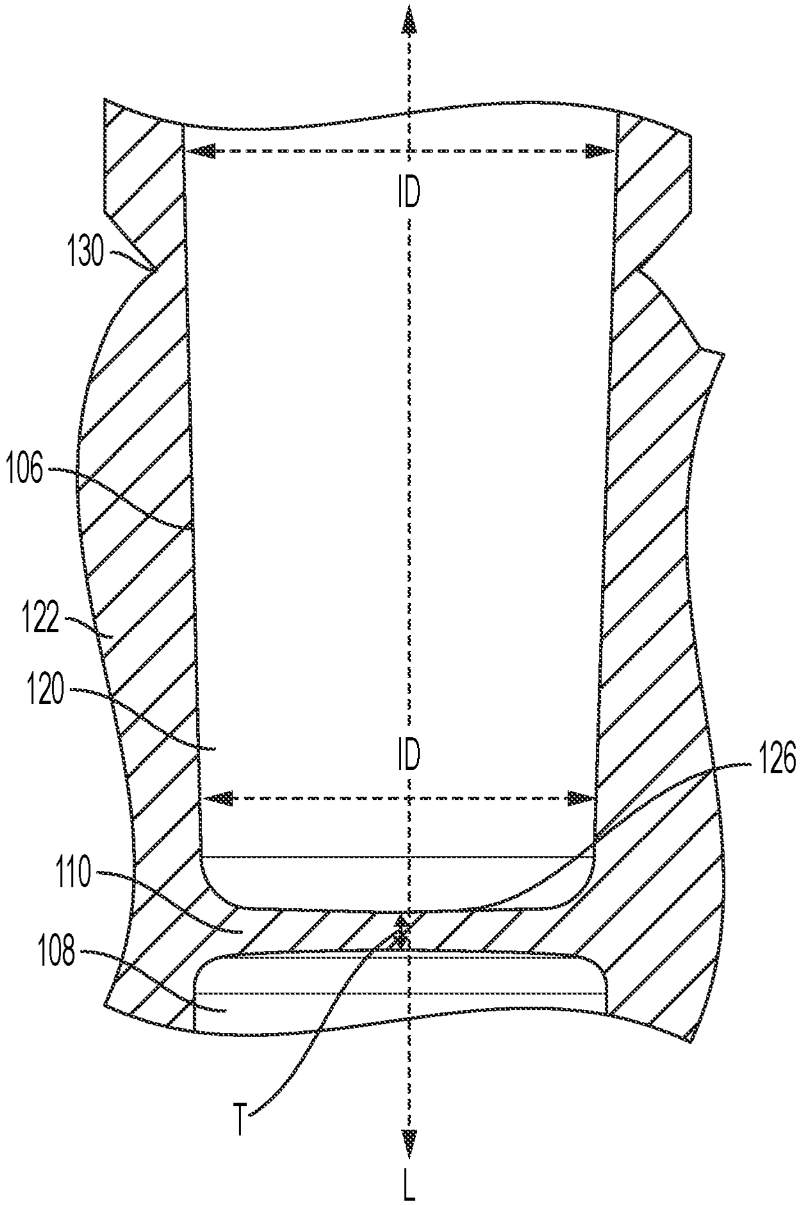
FIG. 3 is an enlarged cross-sectional view of a conduit and septum of the storage bag according to embodiments of the present disclosure.

The septum 110 has a thickness T that allows for piercing by a spike when in use, while also not falling out of the conduit 104 when pierced. The thickness of the septum also prevents breaking when impact is applied to the storage bag 100 and spike port 102 at cryogenic temperatures. In some embodiments, the septum 110 has a thickness from 0.25 mm to 0.64 mm, although other dimensions are also contemplated. As related to the septum 110, the thickness is defined as a dimension of the septum 110 extending parallel to the longitudinal axis L and taken at a narrowest portion of the septum 110, as depicted in FIG. 3. In some embodiments, the septum has a thickness 0.25 mm to 0.6 mm. In some embodiments, the septum has a thickness from 0.25 mm to 0.55 mm. In some embodiments, the septum has a thickness from 0.25 mm to 0.5 mm. In some embodiments, the septum has a thickness from 0.25 mm to 0.45 mm. In some embodiments, the septum has a thickness from 0.25 mm to 0.4 mm. In some embodiments, the septum has a thickness from 0.25 mm to 0.35 mm. In some embodiments, the septum has a thickness from 0.25 mm to 0.3 mm.

In some embodiments, the septum has a thickness from 0.3 mm to 0.64 mm. In some embodiments, the septum has a thickness from 0.35 mm to 0.64 mm. In some embodiments, the septum has a thickness from 0.4 mm to 0.64 mm. In some embodiments, the septum has a thickness from 0.45 mm to 0.64 mm. In some embodiments, the septum has a thickness from 0.5 mm to 0.64 mm. In some embodiments, the septum has a thickness from 0.55 mm to 0.64 mm. In some embodiments, the septum has a thickness from 0.6 mm to 0.64 mm.

In some embodiments, the septum has a thickness from 0.35 mm to 0.55 mm. In some embodiments, the septum has a thickness from 0.3 mm to 0.5 mm. In some embodiments, the septum has a thickness from 0.4 mm to 0.45 mm. In some embodiments, the septum has a thickness from 0.35 mm to 0.4 mm. In some embodiments, the septum has a thickness from 0.35 mm to 0.6 mm. In some embodiments, the septum has a thickness from 0.5 mm to 0.6 mm.

In some embodiments, the inner surface 120 curvedly transitions into a first side 126 of the septum 110, as depicted in FIG. 3, such that the first side 126 of the septum 110 closes off the first portion 106 of the conduit 104 at an end adjacent the second portion 108 of the conduit 104. In some embodiments, the curved transition from the inner surface 120 of the first portion 106 to the septum 110 has a radius of curvature from 0 mm to 1.02 mm. In some embodiments, the curve transition has a radius of curvature from 0.2 mm to 1.02 mm. In some embodiments, the curve transition has a radius of curvature from 0.4 mm to 1.02 mm. In some embodiments, the curve transition has a radius of curvature from 0.6 mm to 1.02 mm. In some embodiments, the curve transition has a radius of curvature from 0.8 mm to 1.02 mm. In some embodiments, the curve transition has a radius of curvature from 1 mm to 1.02 mm.

In some embodiments, the curve transition has a radius of curvature from 0 mm to 1 mm. In some embodiments, the curve transition has a radius of curvature from 0 mm to 0.8 mm. In some embodiments, the curve transition has a radius of curvature from 0 mm to 0.6 mm. In some embodiments, the curve transition has a radius of curvature from 0 mm to 0.4 mm. In some embodiments, the curve transition has a radius of curvature from 0 mm to 0.2 mm. In some embodiments, the curve transition has a radius of curvature from 0 mm to 0.1 mm.

In some embodiments, the smallest diameter of the first portion 106, before the first portion 106 curvedly transitions to the septum 110, is from 3.9 mm to 5.7 mm. In some embodiments, the smallest diameter of the first portion is from 3.9 mm to 5.5 mm. In some embodiments, the smallest diameter of the first portion 106 is from 3.9 mm to 5 mm. In some embodiments, the smallest diameter of the first portion 106 is from 3.9 mm to 4.5 mm. In some embodiments, the smallest diameter of the first portion 106 is from 3.9 mm to 4 mm.

In some embodiments, the smallest diameter of the first portion is from 4 mm to 5.7 mm. In some embodiments, the smallest diameter of the first portion 106 is from 4.5 mm to 5.7 mm. In some embodiments, the smallest diameter of the first portion 106 is from 5 mm to 5.7 mm. In some embodiments, the smallest diameter of the first portion 106 is from 5.5 mm to 5.7 mm.

In some embodiments, the smallest diameter of the first portion is from 4 mm to 5.5 mm. In some embodiments, the smallest diameter of the first portion 106 is from 4 mm to 5 mm. In some embodiments, the smallest diameter of the first portion 106 is from 4 mm to 4.5 mm. In some embodiments, the smallest diameter of the first portion 106 is from 4.5 mm to 5.5 mm. In some embodiments, the smallest diameter of the first portion 106 is from 4.5 mm to 5 mm. In some embodiments, the smallest diameter of the first portion 106 is from 5 mm to 5.5 mm.

In some embodiments the septum 110 is from 4 mm to 20 mm away from the break point 130. In some embodiments, the septum 110 is from 8 mm to 20 mm away from the break point 130. In some embodiments, the septum 110 is from 12 mm to 20 mm away from the break point 130. In some embodiments, the septum 110 is from 16 mm to 20 mm away from the break point 130.

In some embodiments, the septum 110 is from 4 mm to 16 mm away from the break point 130. In some embodiments, the septum 110 is from 4 mm to 12 mm away from the break point 130. In some embodiments, the septum 110 is from 4 mm to 8 mm away from the break point 130.

In some embodiments, the septum 110 is from 4 mm to 16 mm away from the break point 130. In some embodiments, the septum 110 is from 8 mm to 16 mm away from the break point 130. In some embodiments, the septum 110 is from 12 mm to 16 mm away from the break point 130. In some embodiments, the septum 110 is from 4 mm to 12 mm away from the break point 130. In some embodiments, the septum 110 is from 8 mm to 12 mm away from the break point 130. In some embodiments, the septum 110 is from 4 mm to 8 mm away from the break point 130.

In some embodiments, the second portion 108 extends from the septum 110 to the second end 114 of the conduit 104. In some embodiments, the second end 114 is fluidly connected to the interior compartment 118 of the storage bag 100. In some embodiments, the second end 114 is fluidly connected to a port cavity 134, as described in further detail below.

The combination of the decreased inner diameter of the first portion 106 near the septum 110, the taper of first portion 106, and the radius of curvature of the curved transition contributes to the spike insertion and retraction force. This combination of the decreased inner diameter, the radius of curvature, and the septum 110 seal the spike and the conduit 104 when the spike is inserted therethrough, such that a sterile environment is formed between the spike and the spike port 102.

As depicted in FIG. 2, a removable snap portion 116 extends from a break point 130 to a tip 142 of the spike port 102. The first portion 116*a* which is defined by an inner portion of the removable snap portion 116 that surrounds the first end 112 of the conduit 104, seals the conduit 104 prior to use such that the sterile environment is maintained within the storage bag 100 and the conduit 104. In use, in some embodiments, the removable snap portion 116 is configured to break away from the spike port 102 at the break point 130 such that the septum 110 is accessible by the spike via the first portion 106 of the conduit 104, when the removable snap portion 116 is broken away from the spike port 102.

In some embodiments, the break point 130 is positioned adjacent to the first portion 106 of the conduit 104, as depicted in FIGS. 2-3. Thus, as described above, when the removable snap portion 116 is broken away from the spike port 102 at the break point 130, the remainder of the first portion 106 of the conduit 104 and the septum 110 are exposed for insertion of the spike therethrough.

In some embodiments, a thickness of the break point 130 is less than a thickness of the remainder of the conduit wall 122. Specifically, because the break point 130 is thinner than the remainder of the conduit wall 122, the break point 130 is a weakened area designed to allow the removable snap portion 116 to break away upon an applied force. With reference to both the conduit wall 122 and the break point 130, the thickness is a dimension between an inner surface of the conduit 104 and an outer surface of the conduit 104, in a direction perpendicular to the longitudinal axis L. Thus, the break point 130 is configured to break when a snapping force is applied to the removable snap portion 116.

In some embodiments, the break point 130 has a thickness from 0.06 mm to 0.77 mm. In some embodiments, the break point 130 has a thickness from 0.1 mm to 0.77 mm. In some embodiments, the break point 130 has a thickness from 0.2 mm to 0.77 mm. In some embodiments, the break point 130 has a thickness from 0.3 mm to 0.77 mm. In some embodiments, the break point 130 has a thickness from 0.4 mm to 0.77 mm. In some embodiments, the break point 130 has a thickness from 0.5 mm to 0.77 mm. In some embodiments, the break point 130 has a thickness from 0.6 mm to 0.77 mm. In some embodiments, the break point 130 has a thickness from 0.7 mm to 0.77 mm.

In some embodiments, the break point 130 has a thickness from 0.06 mm to 0.7 mm. In some embodiments, the break point 130 has a thickness from 0.06 mm to 0.6 mm. In some embodiments, the break point 130 has a thickness from 0.06 mm to 0.5 mm. In some embodiments, the break point 130 has a thickness from 0.06 mm to 0.4 mm. In some embodiments, the break point 130 has a thickness from 0.06 mm to 0.3 mm. In some embodiments, the break point 130 has a thickness from 0.06 mm to 0.2 mm. In some embodiments, the break point 130 has a thickness from 0.06 mm to 0.1 mm.

In some embodiments, the break point 130 has a thickness from 0.1 mm to 0.7 mm. In some embodiments, the break point 130 has a thickness from 0.2 mm to 0.6 mm. In some embodiments, the break point 130 has a thickness from 0.3 mm to 0.5 mm. In some embodiments, the break point 130 has a thickness from 0.4 mm to 0.7 mm. In some embodiments, the break point 130 has a thickness from 0.5 mm to 0.6 mm. In some embodiments, the break point 130 has a thickness from 0.6 mm to 0.7 mm. In some embodiments, the break point 130 has a thickness from 0.3 mm to 0.6 mm.

In some embodiments, the remainder of the conduit wall 122 has a thickness from 0.5 mm to 6.4 mm. In some embodiments, the remainder of the conduit wall 122 has a thickness from 0.5 mm to 6 mm. In some embodiments, the remainder of the conduit wall 122 has a thickness from 0.5 mm to 5 mm. In some embodiments, the remainder of the conduit wall 122 has a thickness from 0.5 mm to 4 mm. In some embodiments, the remainder of the conduit wall 122 has a thickness from 0.5 mm to 3 mm. In some embodiments, the remainder of the conduit wall 122 has a thickness from 0.5 mm to 2 mm. In some embodiments, the remainder of the conduit wall 122 has a thickness from 0.5 mm to 1 mm.

In some embodiments, the remainder of the conduit wall 122 has a thickness from 1 mm to 6.4 mm. In some embodiments, the remainder of the conduit wall 122 has a thickness from 2 mm to 6.4 mm. In some embodiments, the remainder of the conduit wall 122 has a thickness from 3 mm to 6.4 mm. In some embodiments, the remainder of the conduit wall 122 has a thickness from 4 mm to 6.4 mm. In some embodiments, the remainder of the conduit wall 122 has a thickness from 5 mm to 6.4 mm. In some embodiments, the remainder of the conduit wall 122 has a thickness from 6 mm to 6.4 mm.

In some embodiments, the remainder of the conduit wall 122 has a thickness from 1 mm to 6 mm. In some embodiments, the remainder of the conduit wall 122 has a thickness from 1 mm to 5 mm. In some embodiments, the remainder of the conduit wall 122 has a thickness from 2 mm to 4 mm. In some embodiments, the remainder of the conduit wall 122 has a thickness from 2 mm to 3 mm. In some embodiments, the remainder of the conduit wall 122 has a thickness from 4 mm to 6 mm. In some embodiments, the remainder of the conduit wall 122 has a thickness from 5 mm to 6 mm.

In some embodiments, the spike port 102 includes FEP.

In some embodiments, the spike port 102 includes ETFE.

In some embodiments, the spike port 102 includes PFA.

In some embodiments, the spike port 102 includes an inlet 132, as depicted in FIG. 2. In some embodiments, the inlet 132 is configured to place or transport the cell therapy material into the interior compartment 118 of the storage bag 100 in a sterile manner. Thus, the inlet 132 is configured to be fluidly connected to the interior compartment 118 of the storage bag 100.

Figure 4:
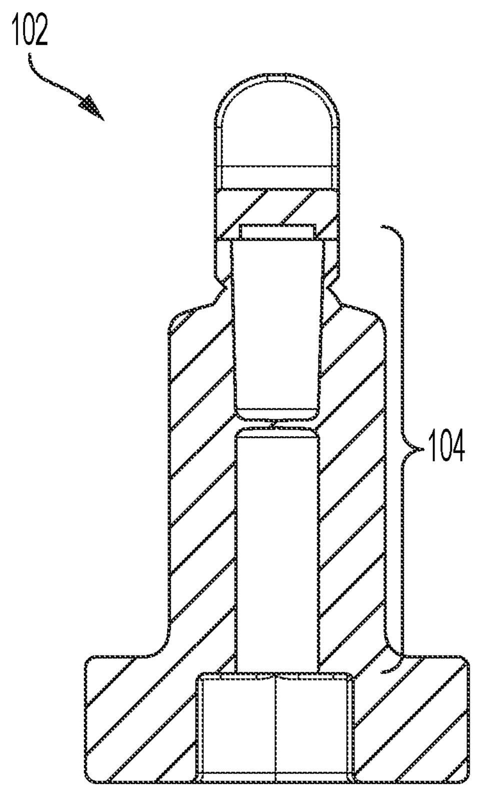
FIG. 4 is a cross-sectional view of a port of a storage bag according to embodiments of the present disclosure.

In some embodiments, the spike port 102 does not include an inlet. Rather, the spike port 102 only includes at least one conduit 104, as depicted in FIG. 4. A separate port could be utilized to allow the transport of the cell therapy material into the interior compartment.

In some embodiments, the spike port 102 includes a port cavity 134, as depicted in FIG. 2. In some embodiments, the port cavity 134 is configured to fluidly connect the second portion 108 of the conduit 104 to the interior compartment 118 of the storage bag 100. In some embodiments, the port cavity 134 aids in the removal of air from the storage bag 100 during the filling of the interior compartment 118. The port cavity 134 also minimizes hold up volume during cell therapy administration. As illustrated in FIG. 2, the port cavity 134 is arranged such that the second end 114 of each conduit 104 may be fluidly coupled with the port cavity 134. This may aid in the drainage of the therapy materials from the storage bag 100. However, as will be described further with reference to FIG. 8, the port cavity 134 may be arranged such that the at least one cavity 104 is not fluidly coupled with the port cavity 134.

Figure 5:
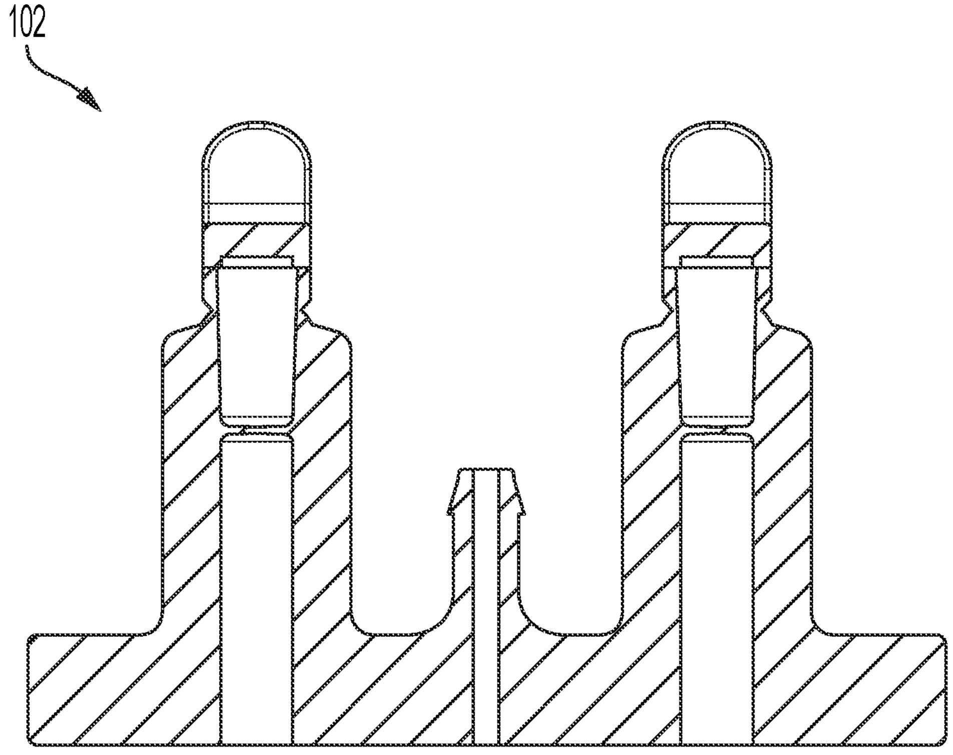
FIG. 5 is a cross-sectional view of a port of a storage bag according to embodiments of the present disclosure.
Figure 9:
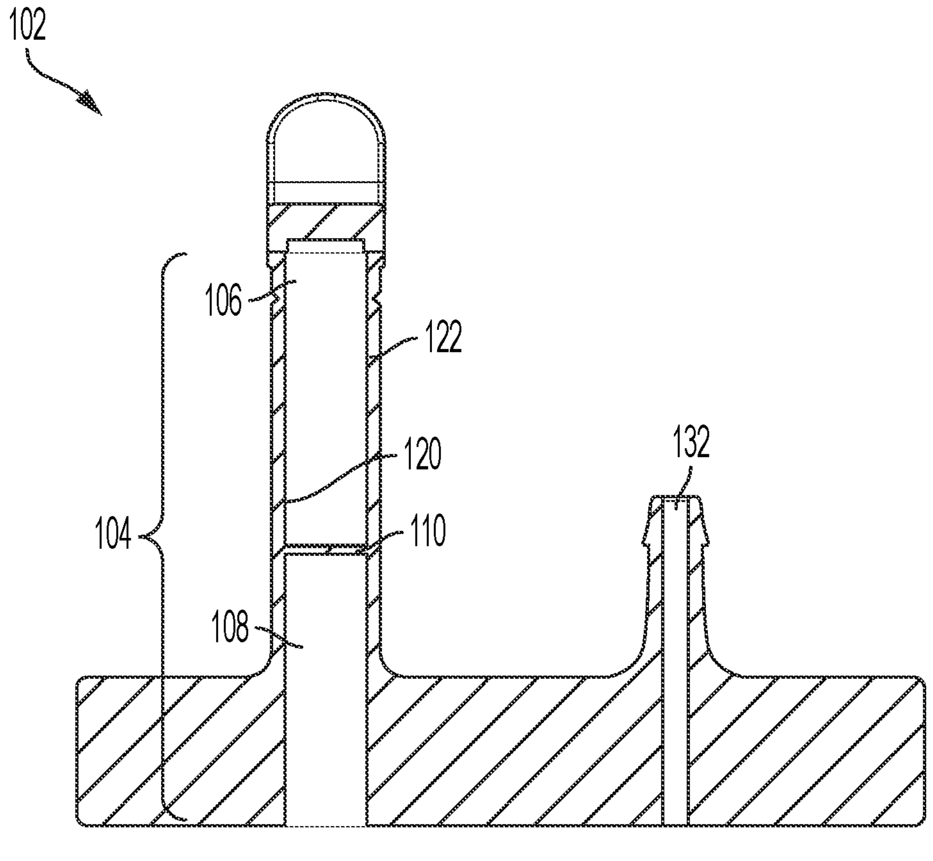
FIG. 9 illustrates a cross-sectional view of a port of a storage bag according to embodiments of the present disclosure.

In some embodiments, the spike port 102 does not include a port cavity 134, as depicted in FIG. 5 and FIG. 9.

Figure 6:
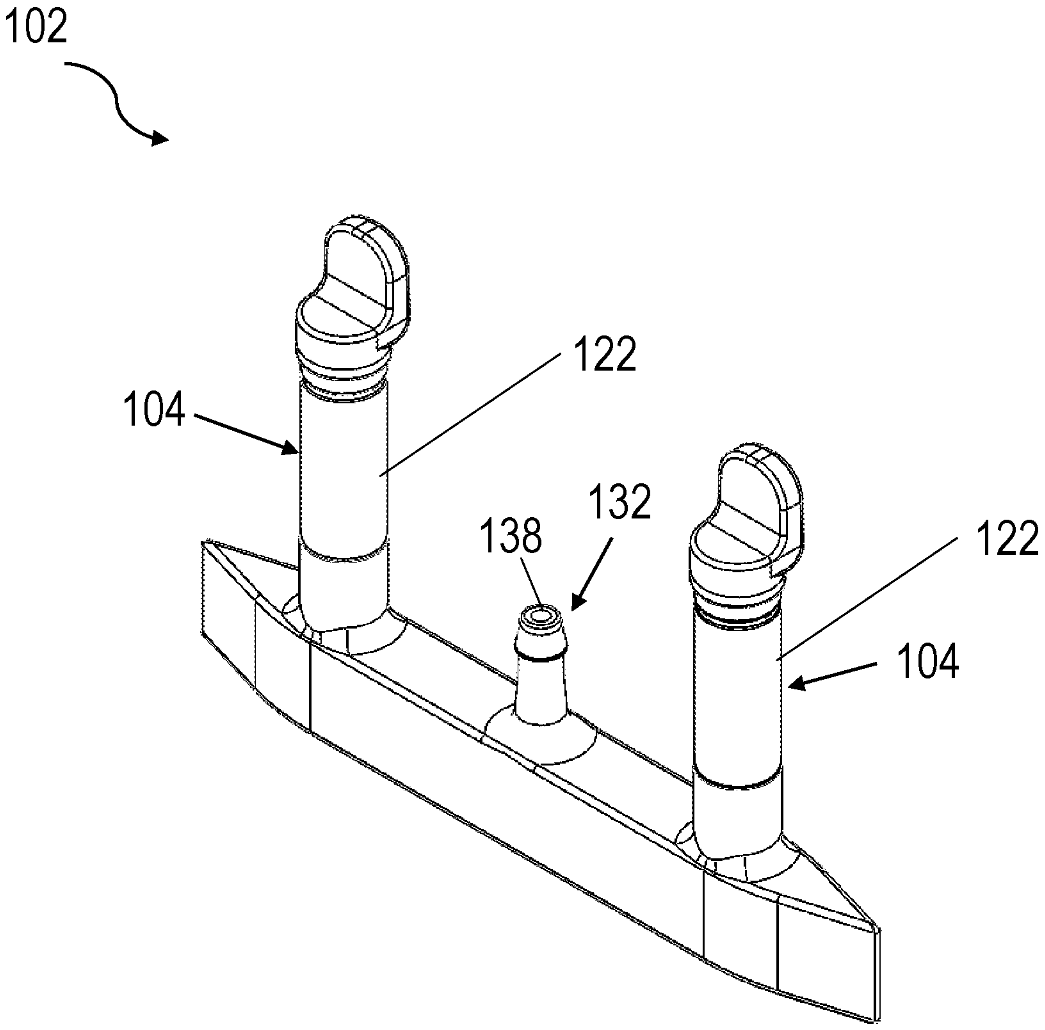
FIG. 6 is an isometric view of a port of a storage bag according to embodiments of the present disclosure.
Figure 7:
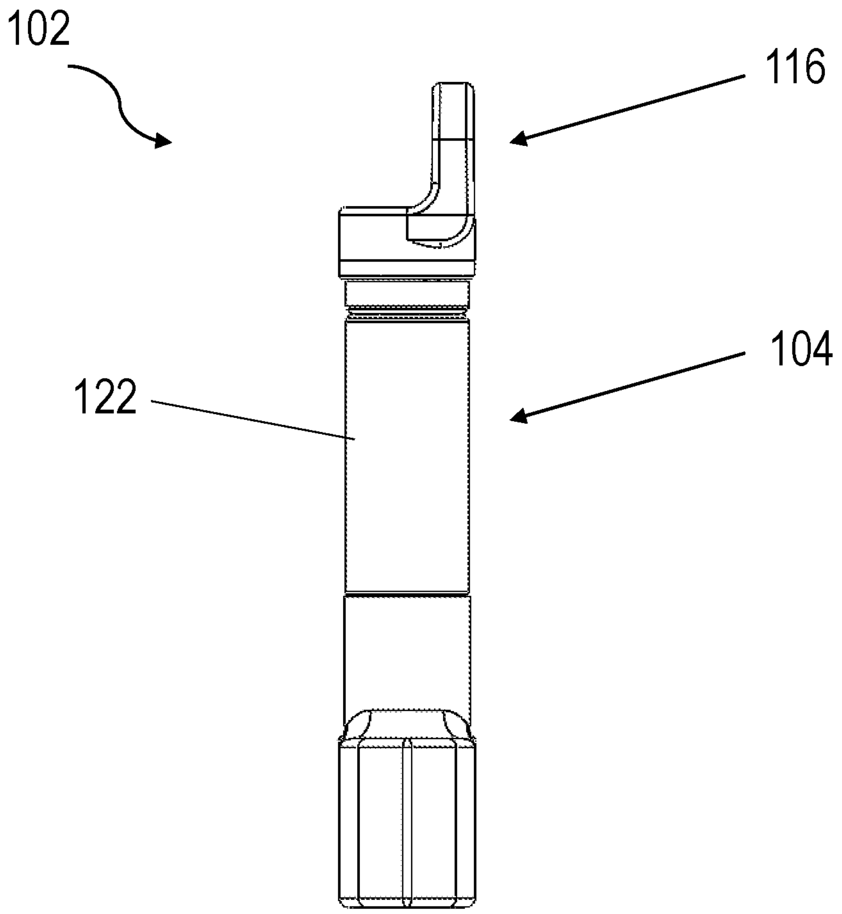
FIG. 7 is a left side view of a port of a storage bag according to embodiments of the present disclosure.
Figure 8:
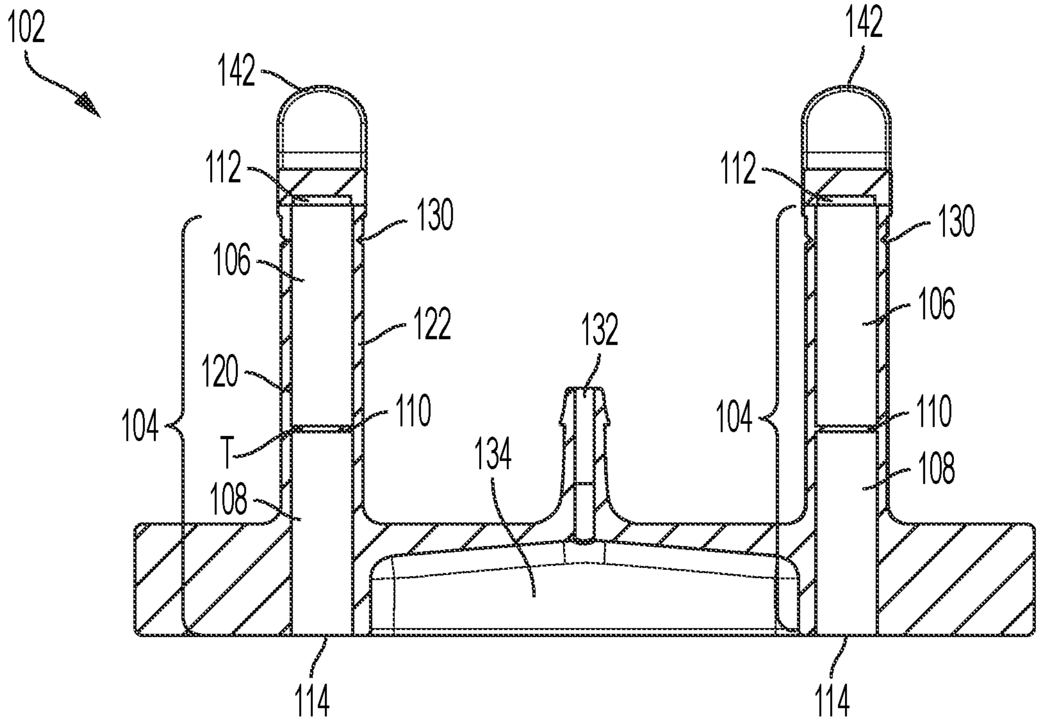
FIG. 8 is a cross-sectional view of a port of a storage bag according to embodiments of the present disclosure.

FIGS. 6-9 illustrate additional embodiments of a spike port 102. For example, FIG. 6 illustrates a top left perspective view of a spike port 102 having two hollow conduits 104 with an inlet 132 arranged between the two conduits 104 and configured for fluidly coupling with the port cavity 134 (FIG. 8), as will be described further herein. As illustrated, the conduits 104 each have a conduit wall 122 that is defined by a generally cylindrical shape and coupled with a removable snap portion 116. The inlet 132 is further defined by a cylindrical shape and has an opening 138 at an uppermost portion of the inlet 132 facilitating reception of the biological therapy, or other fluids, therethrough. FIG. 7 is a left side view of the spike port 102 illustrating one of the at least two conduits 104 and the removable snap portion 116 coupled therewith. The spike port 102 will be described further herein with reference to the cross-sectional views of FIGS. 8-9. For example, FIG. 8 illustrates the spike port 102 having the at least one hollow conduit 104 comprising a first portion 106 and a second portion 108 with a modified septum 110 arranged between the first portion 106 and the second portion 108. Similar to the septum 110 as described with reference to FIGS. 1-5, the septum 110 is configured to be pierced by a spike such that the septum 110 remains attached to the conduit wall 122, while also not creating particles that would contaminate the cell therapy material within the interior compartment 118 of the storage bag 100. The conduits 104 of FIGS. 8-9 may also be configured to have a curve transition from the inner surface 120 of the first portion 104 to the septum 110 having a radius of curvature of approximately 0.0 mm and approximately 1.02 mm. However, as illustrated, the surfaces defining the septum 110 may have a flat profile, which contrasts with the concave configuration of the septum 110 illustrated in FIGS. 1-5. In these instances, the thickness T of the septum may have a value of between approximately 0.25 mm to approximately 0.64 mm, for example, although other dimensions are also contemplated.

Further, FIG. 8 illustrates the spike port 102 including the port cavity 134 arranged between two conduits 104. The port cavity 134 may be arranged such that the conduit 104 is not fluidly coupled with the port cavity 134. In this way, the port cavity 134 is in fluid communication with the inlet 132 and aids in the removal of air from the storage bag 100 during the filling of the interior compartment 118. However, the port cavity 134 does not necessarily aid in the drainage of the therapy materials from the interior of the storage bag 100 through the spike port 102. FIG. 9 illustrates the spike port 102 having one conduit 104 arranged adjacent the inlet 132 without the port cavity 134 incorporated. In this way, the spike port 102 and the conduit 104 may be directly coupled with the interior compartment 118 of the storage bag 100. Additionally, while illustrated as having one conduit 104 and one inlet 132, the spike port 102 may include two or more conduits 104 and/or two or more inlets 132. For example, the spike port 102 may include three conduits 104 and two inlets 132. Although any combination of the amounts of conduits 104 and inlets 132 may be incorporated.

In some embodiments, the spike port 102 includes a first conduit 104 and at least one more conduit 104, with removable snap portion 116, for removal of cell therapy materials stored in the storage bag 100, as depicted in FIG. 2.

In some embodiments, the spike port 102 is formed by injection molding. In some embodiments, the spike port 102 is formed by injection molding the fluoropolymer into a mold. For example, in some embodiments, the spike port 102 is formed by injection molding FEP into a mold. In some embodiments, the spike port 102 is formed by injection molding ETFE into a mold. In some embodiments, the spike port 102 is formed by injection molding PFA into a mold.

Figure 11:
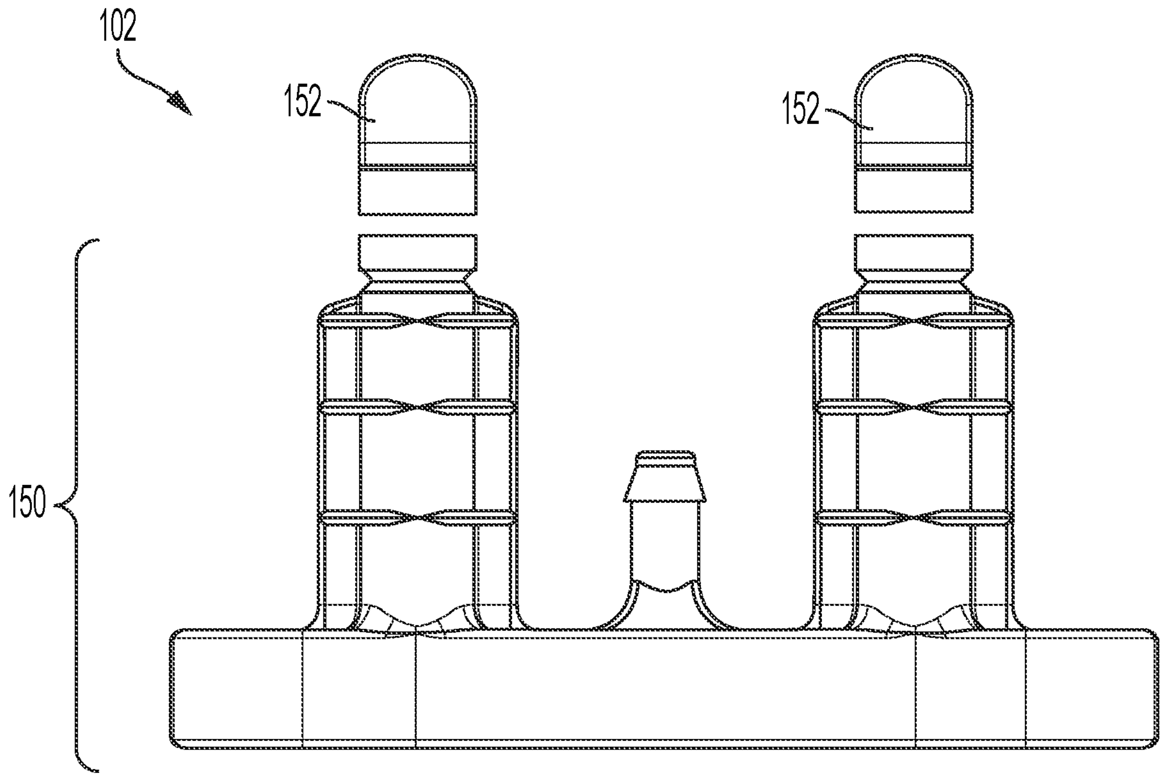
FIG. 11 is a front view of injection molded parts of a port of a storage bag according to embodiments of the present disclosure.

In some embodiments, a main portion 150 of the spike port 102 is injection molded as a singular piece. In some embodiments, snap caps 152 are injection molded as separate singular pieces and welded or adhesively joined to the main portion 150 of the spike port 102, as depicted in FIG. 11. In some embodiments, the spike port 102 is injection molded with additional separate pieces that are subsequently welded or adhesively joined together. In some embodiments, any suitable welding method may be employed including, but not limited to, heat welding, vibration welding, ultrasonic welding, laser welding, etc.

In some embodiments, the septum 110 is a fluoropolymer membrane of FEP that is over molded into the main portion 150 of the spike port 102. In some embodiments, the septum 110 is a fluoropolymer membrane including ETFE that is over molded into the main portion 150 of the spike port 102. In some embodiments, the septum 110 is a fluoropolymer membrane including polytetrafluoroethylene (PTFE). In some embodiments, the septum 110 is a fluoropolymer membrane including expanded polytetrafluoroethylene (ePTFE) that is over molded into the main portion 150 of the spike port 102. In some embodiments, the septum 110 is a fluoropolymer membrane including modified PTFE that is over molded into the main portion 150 of the spike port 102. As used herein, "PTFE" includes homopolymer PTFE and modified PTFE resins (e.g., having up to 1 wt % of one or more ethylenic comonomers including, but not limited to perfluoroalkyl ethylene (e.g. perfluorobutyl ethylene; U.S. Pat. No. 7,083,225 to Baille), hexafluoropropylene, perfluoroalkyl vinyl ether (C1-C8 alkyl; such as perfluoro methyl vinyl ether, perfluoro ethyl vinyl ether, perfluoro propyl vinyl ether, perfluoro octyl vinyl ether, etc.). PTFE is also meant to include, expanded modified PTFE, and expanded copolymers of PTFE, such as, for example, those described in U.S. Pat. No. 5,708,044 to Branca, U.S. Pat. No. 6,541,589 to Baillie, U.S. Pat. No. 7,531,611 to Sabol et al., U.S. Pat. No. 8,637,144 to Ford, and U.S. Pat. No. 9,139,669 to Xu et al. In some embodiments, the septum 110 is a fluoropolymer membrane including densified PTFE that is over molded into the main portion 150 of the spike port 102. In some embodiments, the septum 110 is a fluoropolymer membrane including PFA that is over molded into the main portion 150 of the spike port 102. In some embodiments, the septum 110 is a fluoropolymer membrane including ethylene chlorotrifluoroethylene (ECTFE) that is over molded into the main portion 150 of the spike port 102. In some embodiments, the septum 110 is a fluoropolymer membrane including any combination of FEP, ETFE, PTFE, modified PTFE, expanded PTFE, densified PTFE, PFA or ECTFE that is over molded into the main portion 150 of the spike port 102. In some embodiments, the over molded membrane may be coated to modify the hydrophobic or oleophobic properties of the membrane. In some embodiments, the septum 110 is an integral, thin walled portion of the FEP injection molded main portion 150 of the spike port 102. In some embodiments, the septum 110 is an integral, thin walled portion of the ETFE injection molded main portion 150 of the spike port 102. In further embodiments, the septum 110 is an integral, thin walled portion of the PFA injection molded main body 150 of the septum 110.

In some embodiments, the fluoropolymer has a critical shear rate of greater than 10 $sec^{-1}$. In some embodiments, the fluoropolymer has a critical shear rate of greater than 20 $sec^{-1}$. These critical shear rate ranges allow for injection molding of the fluoropolymer with no or minimal degradation, preventing excessive fibrillation at the removable snap portion 116 when the removable snap portion 116 is broken away from the rest of the spike port 102. As used herein, excessive fibrillation is a level of fibrillation at the break point that causes particle formation or could potentially cause particulate formation through interaction with the user or spike.

Figure 10:
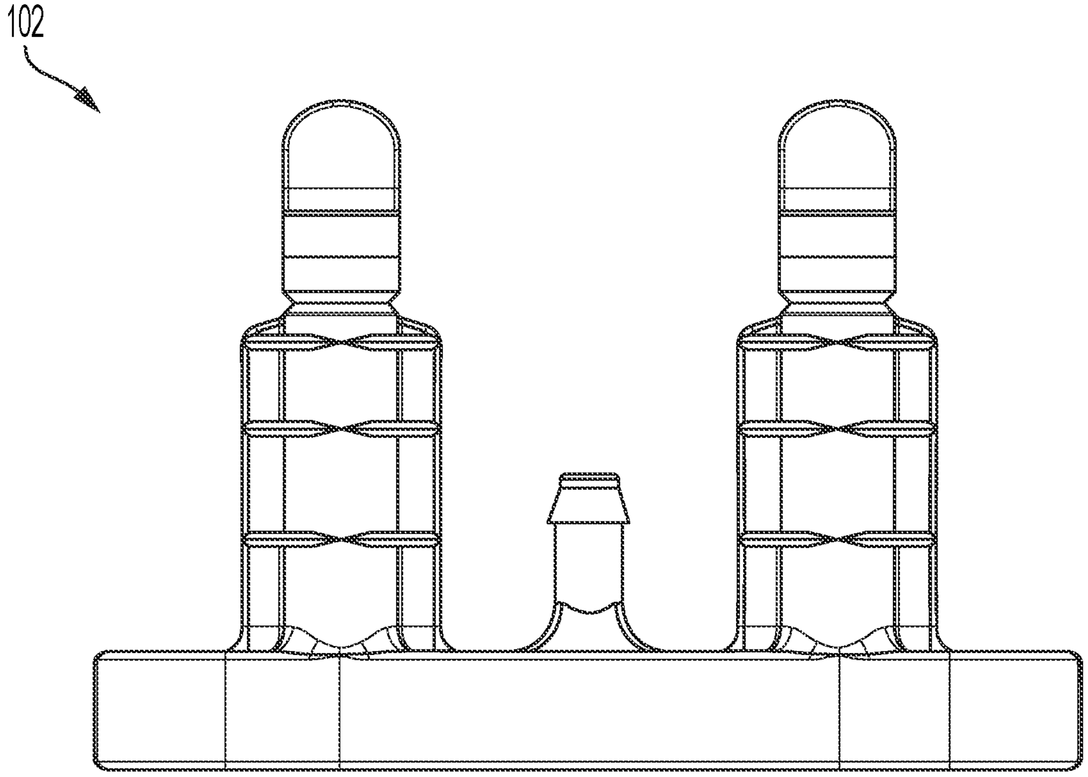
FIG. 10 is a front view of the port of the storage bag according to embodiments of the present disclosure.

In some embodiments, the storage bag 100 is formed by inserting the spike port 102 into a first end of a body 144 of the bag and joining the spike port 102 to the storage bag body 144. In some embodiments, the spike port 102 is sealed to the storage bag body 144 using any suitable method. In some embodiments, the spike port 102 is bonded to the storage bag body 144. In some embodiments, the storage bag 100 is formed of a single-material film. In some embodiments, the storage bag 100 is formed from a composite sheet. A "composite sheet" is defined herein as a sheet formed of at least two different polymers. For example, in some embodiments, the composite sheet may be formed by layering at least two different polymers and applying heat and/or pressure so as to result in the layers of the resultant composite sheet not being removable from each other. In some embodiments, the layer of the composite sheet that faces the interior compartment of the storage bag 100 is a fluoropolymer that is configured to be bonded to the fluoropolymer material of the spike port 102. Specifically, an insertion portion 136 of the spike port 102, depicted in FIG. 10, is inserted into an open end of the storage bag 100. The spike port 102 is subsequently bonded to the composite sheet forming the storage bag 100. In the bonded configuration, a sterile, closed environment is created between the body 144 of the storage bag 100 and the spike port 102. Additionally, when bonded, the spike port 102 and the interior compartment 118 of the storage bag 100 are in fluid communication with each other, as described above.

In use, the storage bag 100 is manufactured with the spike port 102 integrated therewith, creating a sterile and closed environment. In some embodiments, the storage bag 100 is filled with a therapeutic moiety. In order to access the therapeutic cell material, the removable snap portion 116 is snapped off by applying a snapping force to the removable snap portion 116 (i.e., in a direction at an angle to the longitudinal axis L of the conduit 104). Removing the removable snap portion 116 exposes the first portion 106 of the conduit 104 and the septum 110 separating the first portion 106 of the conduit 104 from the second portion 108. A spike is then inserted into the first portion 106 to pierce the septum 110 and advanced into the second portion 108. If the spike port 102 includes a port cavity 134, the spike may be inserted through to the port cavity 134. The combination of the septum 110, the smaller inner diameter of the first portion 106 of the conduit 104, the taper of the first portion 106, the radius of curvature of the curved transition are configured to form a sealed, sterile environment through which the therapeutic materials can flow, when the spike is inserted into the spike port 102.

Various invention aspects have been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A port comprising:

a conduit extending along a longitudinal axis and configured to receive a spike there in;

wherein the conduit is configured to be fluidly connected to an inner compartment of a cryo-durable bag;

wherein the conduit is enclosed by a conduit wall;

wherein the conduit comprises:

i) a first portion defining an inner surface; and ii) a second portion;

a septum fluidly separating the first portion and the second portion of the conduit, the first portion defining a septum curve transition toward the septum;

wherein the septum has a thickness from 0.25 mm to 0.64 mm;

wherein an inner diameter of the first portion at the septum curve transition is from 3.9 mm to 5.7 mm;

wherein the septum is configured to be punctured by the spike that is inserted into the first portion of the conduit so as to allow the spike to be inserted into the second portion of the conduit;

a removable snap portion extending from a break point in the conduit wall to a tip of the port;

wherein the break point has a thickness from 0.06 mm to 0.76 mm;

wherein the removable snap portion is configured to break away from the port at the break point such that the septum is accessible by the spike via the first portion of the conduit when the removable snap portion is broken away from the port;

wherein a material of the port comprises fluorinated ethylene propylene, ethylene tetrafluoroethylene, or perfluoroalkoxy alkane;

wherein the material has a critical shear rate of greater than 10 $sec^{-1}$; and wherein the port is configured to be integrated to the cryo-durable bag.

2. The port of claim 1, further comprising an inlet configured to be fluidly connected to the inner compartment of the cryo-durable bag.

3. The port of claim 1, further comprising a port cavity configured to fluidly connect to the second portion of the conduit to the inner compartment of the cryo-durable bag when the port is bonded to the cryo-durable bag.

4. The port of claim 1, wherein the septum is from 4 mm to 20 mm away from the break point.

5. The port of claim 1, wherein the septum curve transition from the inner surface of the first portion to the septum has a radius of curvature from greater than 0 mm to about 1.02 mm.

6. The port of claim 1, wherein the inner surface of the first portion is at an angle of greater than about 0° to 6° with respect to the longitudinal axis such that the inner diameter is smaller at the septum than at the break point such that the inner surface of the first portion is configured to create a sterile seal with the spike when the spike is inserted into the second portion via the first portion.

7. The port of claim 1, wherein the port is cryo-durable.

8. The port of claim 1, wherein the thickness of the break point is less than a thickness of a remainder of the conduit wall.

9. The port of claim 1, wherein the break point is positioned adjacent to the first portion of the conduit.

10. A port system comprising:

a port comprising:

a conduit extending along a longitudinal axis and configured to receive a spike therein;

wherein the conduit is configured to be fluidly connected to an inner compartment of a cryo-durable bag;

wherein the conduit is enclosed by a conduit wall;

wherein the conduit comprises:

i) a first portion defining an inner surface; and ii) a second portion;

a septum fluidly separating the first portion and the second portion of the conduit;

wherein the septum has a thickness from 0.25 mm to 0.64 mm;

wherein a curve transition from the inner surface of the first portion to the septum has a radius of curvature from greater than about 0 mm to about 1.02 mm;

wherein an inner diameter of the first portion at the curve transition is from 3.9 mm to 5.7 mm;

wherein the septum is configured to be punctured by the spike that is inserted into the first portion of the conduit so as to allow the spike to be inserted into the second portion of the conduit;

a removable snap portion extending from a break point in the conduit wall to a tip of the port;

wherein the break point has a thickness from 0.06 mm to 0.76 mm;

wherein the thickness of the break point is less than a thickness of a remainder of the conduit wall;

wherein the break point is positioned adjacent to the first portion of the conduit;

wherein the removable snap portion is configured to break away from the port at the break point such that the septum is accessible by the spike via the first portion of the conduit when the removable snap portion is broken away from the port;

wherein a material of the port comprises fluorinated ethylene propylene, ethylene tetrafluoroethylene, or perfluoroalkoxy alkane;

wherein the material has a critical shear rate of greater than 10 $sec^{-1}$; and a cryo-durable bag integrated with the port.

11. The port system of claim 10, wherein the port further comprises an inlet configured to be fluidly connected to the inner compartment of the cryo-durable bag.

12. The port system of claim 11, wherein the port further comprises a port cavity fluidly connected with the inlet.

13. The port system of claim 12, wherein the port cavity is fluidly connected the second portion of the conduit to the inner compartment of the cryo-durable bag when the port is bonded to the cryo-durable bag.

14. The port system of claim 10, wherein the inner surface of the first portion is at an angle of about 0° to about 6° with respect to the longitudinal axis such that the inner diameter is smaller at the septum than at the break point such that the inner surface of the first portion is configured to create a sterile seal with the spike when the spike is inserted into the second portion via the first portion.

15. The port system of claim 10, wherein the port is cryo-durable.

16. A port comprising:

at least one conduit extending along a longitudinal axis and configured to receive a spike therein, wherein the at least one conduit is configured to be fluidly connected to an inner compartment of a cryo-durable bag, wherein the at least one conduit is enclosed by a conduit wall and comprises a first portion defining an inner surface and a second portion;

a septum fluidly separating the first portion and the second portion of the at least one conduit, wherein the septum is configured to be punctured by the spike that is inserted into the first portion of the at least one conduit so as to allow the spike to be inserted into the second portion of the at least one conduit;

a removable snap portion extending from a break point in the conduit wall to a tip of the port, the removable snap portion configured to break away from the port at the break point;

wherein a material of the port comprises fluorinated ethylene propylene, ethylene tetrafluoroethylene, or perfluoroalkoxy alkane, wherein the material has a critical shear rate of greater than 10 $sec^{-1}$;

wherein the port is configured to be integrated to the cryo-durable bag;

wherein the inner surface of the first portion is angled greater than about 0° to about 6.0° with respect to the longitudinal axis and a curve transition from the inner surface of the first portion to the septum has a radius of curvature of about greater than 0 mm to about 1.02 mm.

17. The port of claim 16, further comprising an inlet configured to be fluidly connected to the inner compartment of the cryo-durable bag.

18. The port of claim 17, wherein the at least one conduit includes a first conduit and a second conduit, and wherein the inlet is arranged between the first conduit and the second conduit.

19. The port of claim 18, further comprising a port cavity configured to fluidly connect to the inlet to fluidly connect the inner compartment of the cryo-durable bag and the inlet.

20. The port system of claim 19, wherein the port further comprises a port cavity configured to fluidly connect the second portion of the conduit to the inner compartment of the cryo-durable bag when the port is bonded to the cryo-durable bag.

21. The port of claim 16, wherein the port is cryo-durable.

22. The port of claim 16, wherein the septum has a thickness from 0.25 mm to 0.64 mm and wherein an inner diameter of the first portion at the septum curve transition is from 3.9 mm to 5.7 mm.

* * * * *